United States Patent
Aucejo Romero et al.

(10) Patent No.: US 9,175,161 B2
(45) Date of Patent: *Nov. 3, 2015

(54) POLYMER NANOCOMPOSITE COMPRISING POLYLACTIC ACID REINFORCED WITH THE MODIFIED PHYLLOSILICATE

(75) Inventors: Susana Aucejo Romero, Paterna (ES); María Jordá Beneyto, Paterna (ES); José María Alonso Soriano, Paterna (ES); Miriam Gallur Blanca, Paterna (ES); José María Bermúdez Saldaña, Paterna (ES); Mercedes Hortal Ramos, Paterna (ES)

(73) Assignee: INSTITUTO TECHNOLÓGICO DEL EMBALAJTE, TRANSPORTE Y LOGÍSTICA (ITENE), Paterna (ES)

( * ) Notice: Subject to any disclaimer, the term of this patent is extended or adjusted under 35 U.S.C. 154(b) by 0 days.

This patent is subject to a terminal disclaimer.

(21) Appl. No.: 13/814,084

(22) PCT Filed: Aug. 3, 2011

(86) PCT No.: PCT/EP2011/063405
§ 371 (c)(1),
(2), (4) Date: Feb. 22, 2013

(87) PCT Pub. No.: WO2012/017025
PCT Pub. Date: Feb. 9, 2012

(65) Prior Publication Data
US 2013/0177723 A1 Jul. 11, 2013

(30) Foreign Application Priority Data
Aug. 1, 2010 (EP) .................................... 10382216

(51) Int. Cl.
C08L 67/04 (2006.01)
C08K 9/04 (2006.01)
(Continued)

(52) U.S. Cl.
CPC . C08L 67/04 (2013.01); C08K 3/34 (2013.01); C08K 5/19 (2013.01); C08K 9/04 (2013.01); *Y10T 428/1345* (2015.01); *Y10T 428/1397* (2015.01)

(58) Field of Classification Search
CPC ............ C08L 67/04; C08K 3/34; C08K 5/19; C08K 9/04; Y10T 428/1345; Y10T 428/1397
USPC .......................................................... 524/236
See application file for complete search history.

(56) References Cited

U.S. PATENT DOCUMENTS 6,191,333 B1    2/2001  Benazzi et al.
2004/0042750 A1*  3/2004  Gillberg et al. ............... 385/128

FOREIGN PATENT DOCUMENTS

EP          1787918 A1     5/2007
FR          2771308 A1     5/1999
WO      WO 2009/127000      * 10/2009    ............... C08K 9/04

OTHER PUBLICATIONS

PLA 2002D Data Sheet. 2005.*
(Continued)

*Primary Examiner* — John Uselding
(74) *Attorney, Agent, or Firm* — Peter B. Scull; Hamilton, DeSanctis & Cha LLP

(57) ABSTRACT

Polymer nanocomposite having: a) a polylactic polymer; and b) a modified phyllosilicate composition having a modifying agent which includes hexadecyl trimethyl ammonium cations which are intercalated between the layers of the phyllosilicate; and preparation process of such a polymer nanocomposite. The polymer nanocomposite is particularly useful for packaging, particularly food and drink packaging.

13 Claims, 3 Drawing Sheets

(51) Int. Cl.
 *C08K 3/34* (2006.01)
 *C08K 5/19* (2006.01)

(56) References Cited

OTHER PUBLICATIONS

Aucejo-Romero et al., Approved clay-biopolymer nanocomposites for food contact applications, 16th IAPRI World Conference on Packaging Book of Abstracts, p. 81, Jun. 8-12, 2008, Bangkok, Thailand.
ASTM E96: Standard Test Methods for Water Vapor Transmission of Materials, 24 CFR 3880.504(a), American Society for Testing and Materials, (the year of publication is sufficiently earlier than the effective U.S. filing date and any foreign priority date so that the particular month of publication is not in issue) 1995, pp. 785-792, American Society for Testing and Materials, Philadelphia, PA, USA.
ASTM Designation D: 3985-02, Standard Test Method for Oxygen Gas Transmission Rate Through Plastic Film and Sheeting Using a Coulometric Sensor, ASTM International, (the year of publication is sufficiently earlier than the effective U.S. filing date and any foreign priority date so that the particular month of publication is not in issue) 2002, pp. 1-6, ASTM International, West Conshohocken, PA, USA.
European Standard, EN ISO 527-1, Version En espanol, Plasticos Determinacion de las propiedades en traction, Parte 1: Principios Generales, (ISO 527-1:1993 incluye Corr 1:1994), Feb.,1996, pp. 1, 4-16, CEN, Comite Europeo De Normalizacion, European Committee for Standardization, Comite Europeen de Normalisation, Europaisches Komitee fur Normung, Bruxelles, Belgium. English language counterpart is BS EN ISO 527-1 cited below.
British Standard Institute, BS EN ISO 527-1:1996, BS 2782-3: Method 321:1994, ISO 527-1:1993, Incorporating Amendment No. 1, Plastics—Determination of tensile properties, (the year of publication is sufficiently earlier than the effective U.S. filing date and any foreign priority date so that the particular month of publication is not in issue) 1996, pp. 1-16, British Standard Institute, London, England. English language counterpart to EN ISO 527-1 cited above.
International Search Report and Written Opinion of the International Searching Authority, Search Report, Application No. PCT/EP2011/063405 issued by the European Patent Office, Munich, Germany, dated Sep. 14, 2011.

\* cited by examiner

POLYMER NANOCOMPOSITE COMPRISING POLYLACTIC ACID REINFORCED WITH THE MODIFIED PHYLLOSILICATE

The present disclosure relates to a polymer nanocomposite containing a modified phyllosilicate, its preparation process, as well as its use for packaging, particularly food packaging.

BACKGROUND

In recent years, biodegradable resins, for example, polylactic acid (PLA) have come into focus from the viewpoint of environmental preservation. PLA is biodegradable thermoplastic aliphatic polyester, derived from renewable resources, such as corn starch or sugarcanes. PLA is a rigid and highly transparent biodegradable resin.

However, PLA has an insufficient gas barrier property for use as a material for fluid storage containers such as food storage containers. PLA has insufficient mechanical properties in some applications, e.g. packaging, due to its rigidity. Finally, PLA has too, insufficient thermal resistance for hot filling or transportation of bottles during the summer months. Hot filling is one of the methods that beverage makers use to reduce the chances pathogens end up in their products. The hot-filling process involves filling containers immediately after the product has been sterilized through a thermal processing operation at high temperature.

Therefore, PLA has limitations in its applications. In order to modify the gas barrier, thermal resistance and mechanical properties of PLA, the incorporation of nano-scale silicate by dispersion in the polymer matrix is a good solution.

Nanocomposites are sometimes prepared today using organically modified silicates produced by a cation exchange reaction between the silicate and usually an alkylammonium salt.

Preparation of modified phyllosilicates is well known. Thus, under appropriate conditions an organic compound containing a cation that can react by ion exchange with a phyllosilicate containing a negative layer lattice and exchangeable cations does so react to form the modified phyllosilicate.

The patent application EP1787918 describes a biodegradable polyester resin reinforced by a phyllosilicate. The phyllosilicate is substituted with ammonium, pyridinium, imidazolium, or phosphonium ions. Examples of ammonium ions include tetraethylammonium, octadecyltrimethylammonium, and dimethyldioctadecylammonium among other ions. The resin has improved barrier properties but no consideration is given regarding improvements in the mechanical properties such as the elongation at break.

Thus, from what is known, it is derived that the development of a material with improved mechanical, thermal and barrier properties is still of great interest.

SUMMARY

It has been found that the incorporation of a modified phyllosilicate composition including a hexadecyltrimethyl ammonium cation to a biodegradable polymer, in particular polylactic polymer (PLA) results in a polymer nanocomposite showing not only improved mechanical properties but also improved barrier properties and thermal resistance.

The fact that the polymer nanocomposite hereof shows excellent barrier properties is advantageous on the one hand, for its use for storage of aqueous drinks (e.g. water, juice, milk) since the loss of water vapour through the wall of the bottles is minimized. On the other hand, it is also advantageous for its use for food storage. Food containers must present a good barrier property against the diffusion of oxygen into the container, to avoid the spoliation of the food products caused by the presence of oxygen therein.

In addition, the polymer nanocomposite hereof shows excellent mechanical strength and less rigidity which is an advantage for packaging long term storage, avoiding the polymer nanocomposite deformation and cracking.

It has not previously been suggested that a phyllosilicate modified with hexadecyl trimethyl ammonium cations could confer to PLA both excellent mechanical and barrier properties, as well as thermal resistance.

Therefore, an aspect of the present disclosure relates to a polymer nanocomposite having a polylactic polymer and a modified phyllosilicate composition, the phyllosilicate having a modifying agent which includes hexadecyl trimethyl ammonium cations which are intercalated between the layers of the phyllosilicate.

The silicate used in the nanocomposite hereof belongs to the family of phyllosilicates, preferably smectite group. These compounds are characterized by their swelling properties and high cation-exchange capacities.

Different compounds may be added to the polymer nanocomposite, such as pigments, heat stabilizers, antioxidants, water resistant agents, flame retarders, terminal blocking agents, plasticizers, lubricants, mold release agents, antistatic agents, fluorescent brightening agents, processing aids, chain extenders, impact modifiers, UV stabilizers, antifog agents and/or different fillers. Examples of processing aids include acrylic polymers. Examples of chain extenders include acrylic copolymers. Examples of impact modifiers include ethylene, acrylic copolymers and polymers. Examples of UV stabilizers include benzotriazol, benzophenones and piperidine derivatives. Examples of antioxidants include phenol, phosphates and tocopherol. Example of antistatics include ethoxylated fatty ester. Examples of plasticisers include adipates, polyadipates, citrate esters, glycols and polyglycols. Examples of antifog agents include ethoxylated fatty ester.

Another aspect hereof relates to a process for the preparation of the nanocomposite as defined above, which includes the following operations: a) drying the modified phyllosilicate and the polylactic polymer, and b) melt-blending the biodegradable polymer and the modified phyllosillicate by an extruder.

The improved mechanical, thermal and barrier properties of the polymer nanocomposite make it especially useful as a container, bag or film.

Therefore another aspect of the present disclosure relates to a container, bag or film made of the nanocomposite as defined above.

DETAILED DESCRIPTION

Figure 1:
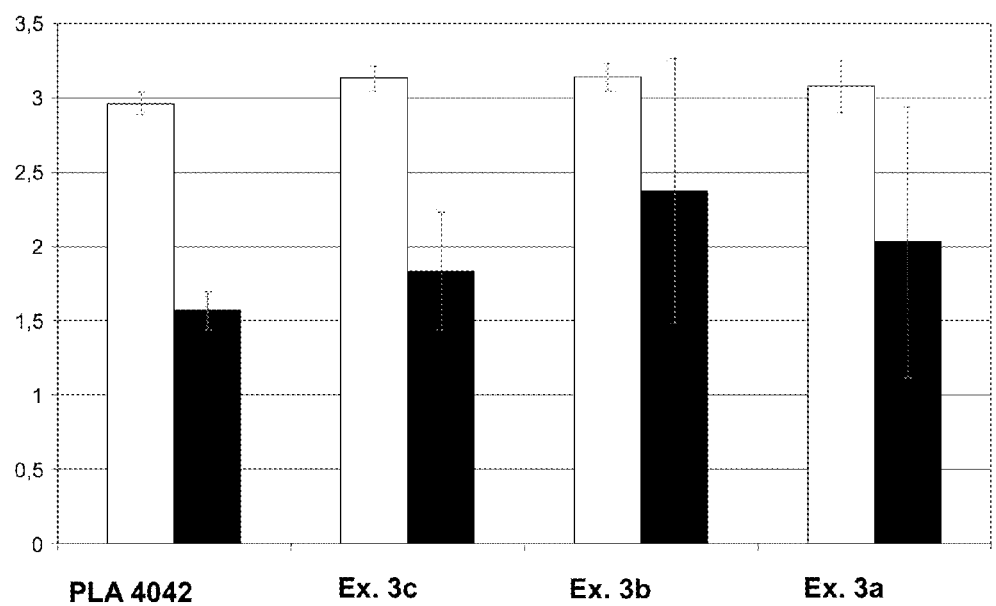
FIG. 1 shows the young Modulus (GPa), (white column) and the elongation at break (mm), (black column) of different samples.

As mentioned above, an aspect of the present disclosure relates to a polymer nanocomposite including a polylactic polymer and a modified phyllosilicate composition.

The term "polymer nanocomposite" as used herein, refers to a polymeric material and a reinforcing nanoscale material. The nanoscale material has at least one dimension in the nanometer size range. In the case of the present disclosure the reinforcing nanoscale material is the modified phyllosilicate composition of the present disclosure with a lamellae thickness around 1 nm.

The term "phyllosilicates" as used herein, refers to layered silicates in which the $SiO_4$ tetrahedra are linked together in two dimensional sheets and are condensed with layers of $AlO_6$ or MgO octahedra in the ratio 2:1 or 1:1. The negatively charged layers attract positive cations (e.g. $Na^+$, $K^+$, $Ca^{2+}$, $Mg^{2+}$.) which can hold the layers together. Non-limiting exemplar phyllosilicates which may be used within the scope hereof are sodium montmorillonite, magnesium montmorillonite, calcium montmorillonite. In a preferred implementation, the phyllosilicate is sodium montmorillonite.

The term "modified phyllosilicates" as used herein, refers to phyllosilicates wherein the positive cations (e.g. $Na^+$, $K^+$, $Ca^{2+}$, $Mg^{2+}$), are exchanged by ion exchange reactions with alkylammonium cations as modifying agents. Particularly, the modified phyllosilicate hereof includes hexadecyl trimethyl ammonium and, optionally acetylcholine or choline cations, as modifying agents.

The term polylactic (PLA) as used herein, refers to a biodegradable, thermoplastic, aliphatic polyester derived from renewable sources. The term PLA includes poly-L-lactide (PLLA), the product resulting from polymerization of L,L-lactide and poly-D-lactide (PDLA), the product resulting from polymerization of D,L-lactide. All commercial grades are included in the term PLA as used herein, commercial grades are copolymers of PLLA and PDLA in different ratios.

In a preferred implementation the ratio phyllosilicate composition/polylactic polymer is between about 0.5:99.5 and about 20:80 weight/weight ratio. In a more preferred implementation the ratio phyllosilicate composition/polylactic polymer is between about 2:98 and about 18:82 weight/weight ratio. In another more preferred implementation the ratio phyllosilicate composition/polylactic polymer is between about 4:96 and about 16:84 weight/weight ratio.

The modifiers are added in excess to the cation exchange capacity (CEC) of the phyllosilicate and a value of 0.5-10 times the CEC was established as the optimum. For the preparation of these modified phyllosilicates with a mixture of modifiers, firstly performed was the exchange with choline or acetylcholine at a low concentration (0.1-1 CEC), and afterwards the exchange with the hexadecyl trimethyl ammonium was carried out (0.4-9.9 CEC). Therefore in a more preferred implementation in the nanocomposite with a mixture of modifiers, the amount of acetylcholine or choline is 0.20-0.75 meq/100 g the value of the phyllosilicate CEC and the amount of hexadecyl trimethyl ammonium cation is 5.25-5.80 meq/100 g the value of the phyllosilicate CEC. Therefore in another more preferred implementation in the nanocomposite with a mixture of modifiers, the amount of acetylcholine or choline is 0.25-0.50 meq/100 g the value of the phyllosilicate CEC and the amount of hexadecyl trimethyl ammonium cation is 5.55-5.75 meq/100 g the value of the phyllosilicate CEC.

As mentioned above the corresponding nanocomposite can be obtained by a process which includes the following operations: a) drying the modified phyllosilicate and the polymer, and b) melt-blending the biodegradable polymer and the modified phyllosilicate with an extruder.

In a preferred implementation the melt-blending operation is carried out at a temperature between 190° C.-210° C.

In a preferred implementation, the process further includes a previous operation of preparing the modified phyllosilicate which includes the operations: (a) dispersing the phyllosillicate in water and an $C_1$-$C_{10}$ alcohol; (b) applying an ultrasonic wave; (c) optionally adding choline salt or acetylcholine salt (d) adding hexadecyl trimethyl ammonium salt; (e) maintaining the mixture of operation (d) at a temperature comprised between 20° C. and 120° C.; (f) isolating the compound obtained in operation (d), wherein the operations a), b), c), and d) can be carried out in any order.

In a preferred implementation the phyllosilicate is dispersed in water and ethanol.

In a preferred implementation, the choline salt added is choline halide. In a more preferred implementation the choline salt added is choline chloride.

In a preferred implementation, the acetylcholine salt added is acetylcholine halide. In a more preferred implementation the acetylcholine salt added is acetylcholine chloride.

In a preferred implementation the hexadecyl trimethyl ammonium salt added is hexadecyl trimethyl ammonium halide. In a more preferred implementation the hexadecyl trimethyl ammonium salt added is hexadecyl trimethyl ammonium bromide.

In a preferred implementation the addition of choline salt or acetylcholine salt and the addition of hexadecyl trimethyl ammonium salt is carried out slowly.

In a preferred implementation the mixture of operation (d) is maintained at a temperature between about 20° C. and about 90° C. In another preferred implementation, the mixture of operation (d) is maintained at a temperature between about 50° C. and about 90° C. In a more preferred implementation the mixture of operation (d) is maintained at a temperature between about 65° C. and about 75° C.

In a preferred implementation the isolating operation includes purifying of the prepared modified phyllosilicate. In a more preferred implementation the phyllosilicate is purified with a solution of water:ethanol, in particular, the solution is added to the modified phyllosilicate, and the mixture is maintained under stirring at a temperature between about 50° C. to about 90° C. The product is filtered and the conductivity of the mother liqueours is measured. This process is repeated until the mother liqueours have a conductivity below 5-30 µS/cm.

In a more preferred implementation the isolating operation includes a drying operation of the phyllosilicate after the purification. The drying operation is carried out at a temperature between about 70° C. and about 90° C. It can be carried out in a conventional oven, by lyophilisation or by atomization. Generally, the drying process lasts at least about 12 hours. After the drying operation, the phyllosilicate can be milled, and sieved. Generally it is sieved to a particle size below 25 microns.

Throughout the description and claims the word "comprise" and variations of the word, are not intended to exclude other technical features, additives, components, steps or operations. Additional objects, advantages and features hereof will become apparent to those skilled in the art upon examination of the description or may be learned by practice of the invention. The following examples and drawings are provided by way of illustration, and they are not intended to be limiting of the present invention. Reference signs related to drawings and placed in parentheses in a claim, are solely for attempting to increase the intelligibility of the claim, and shall not be construed as limiting the scope of the claim. Furthermore, the present invention covers all possible combinations of particular and preferred implementations described herein

EXAMPLES

Example 1

Preparation of Montmorillonite Modified with Hexadecyltrimethyl Ammonium Cations and Acetylcholine or Choline

Example 1a

Montmorillonite with 5.5 CEC of HDTA and 0.5 CEC of ACO

Purified sodium montmorillonite (Closiste® Na$^+$) was purchased from Southern Clay Products, with moisture content between 4 and 9%. CEC of sodium montmorillonite was 92.6 mequiv/100 g.

Quaternary ammonium salts were supplied by Acros Organics. Choline (CO) chloride, acetylcholine (ACO) chloride, and hexadecyltrimethyl ammonium (HDTA) bromide with 99% of purity, and trimethyloctadecylammonium bromide 98% were purchased from Fluka.

For the production of the modified phyllosilicate modified with acetylcholine and hexadecyltrimethyl ammonium cations, 20 grams of purified sodium montmorillonite were dispersed in water at 70° C. under energetic stirring. After that, 200 ml of ethanol were added. Later, the mixture was subjected to an ultrasound treatment.

Then 1.48 grams of acetylcholine chloride were dissolved in 250 ml of ethanol at 70° C. After that, phyllosilicate suspension was added slowly. Once this operation was finalized, 37.12 grams of the modifier hexadecyltrimethyl ammonium bromide were dissolved in 250 ml of ethanol, and the solution previously prepared was added. After that, the solution was kept, during at least 12 hours (at 70° C.), in a continuous stirring disposition. A cation exchange reaction between the hydrated cations (inside the montmorillonite layers) and the alkyl ammonium ions was carried out in this aqueous-ethanolic solution.

The next operation includes purifying the prepared modified phyllosilicate. With this purpose, a 1l solution 50:50 vol water:ethanol was prepared. After filtering the mixture under vacuum, fresh solution was added to the modified phyllosilicate, and the mixture was maintained under stirring at 70° C. at least 2 hours. The procedure was repeated until the solution filtered was below 5 µS/cm in conductivity.

The next operation includes drying of the phyllosilicate at 70° C. during at least 12 hours. Finally, the phyllosilicate was milled, and sieved to a particle size below 25 microns. The modified phyllosilicate obtained is a Cloisite (CLO) with 5.5 CEC of HDTA and 0.5 CEC of ACO.

Example 1b

Montmorillonite with 5.75 CEC of HDTA and 0.25 CEC of ACO

A CLO with 5.75 CEC of HDTA and 0.25 CEC of ACO was obtained following the process of Example 1b but using the ACO halide dissolved in 250 ml of ethanol. ACO mass was 0.84 grams, and HDTA mass was 38.81 grams.

Example 1c

Montmorillonite with 5.75 CEC of HDTA and 0.25 CEC of CO

A CLO with 5.75 CEC of HDTA and 0.25 CEC of CO was obtained following the process of Example 1b but using 0.65 grams of CO halide dissolved in 250 ml of ethanol.

Example 2

Preparation of Montmorillonite Modified with Hexadecyltrimethyl Ammonium Cations For the production of the montmorillonite modified with hexadecyltrimethyl ammonium cations, the same process of Example 1 was carried out but starting from 40.50 grams of hexadecyltrimethyl ammonium bromide which has been dissolved in 500 ml of ethanol. The modified phyllosilicate obtained is a CLO with 6 CEC of HDTA.

Comparative Example 1

Preparation of Montmorillonite Modified with Trimethyloctadecyl Ammonium (ODTA) Cations For the production of the montmorillonite modified with (ODTA) cations the same process of Example 2 was carried out but starting from 43.62 grams of (ODTA) bromide. The modified phyllosilicate obtained is a CLO with 6 CEC of ODTA

Example 3

Preparation of PLA-Phyllosilicate Nanocomposites

Example 3a

PLA4042-Phyllosilicate (Montmorillonite with 5.5 CEC of HDTA and 0.5 CEC of ACO)

PLA nanocomposite samples were obtained with the modified phyllosilicate prepared in Example 1a, and PLA 4042.

For this purpose a DSM Xplore Microcompounder (15 cc) was used. PLA pellets (dried overnight at 60° C.) were blended with 4% by weight of modified phyllosilicate in this co-rotating twin screw micro-extruder. The temperature of processing was 200° C. The rotation speed of the screw was maintained at 100 r.p.m., and residence time was set to 10 min. After extrusion, the melted materials were transferred through a preheated cylinder (200° C.) to the mini injection moulding machine (4 cc) (DSM Xplore) to obtain bone-like specimen samples (ISO 527 standard; probe type 5A-B)

Example 3b

PLA4042-Phyllosilicate (Montmorillonite with 5.75 CEC of HDTA and 0.25 CEC of ACO)

The same process of Example 3a was carried out but with the modified phyllosilicate prepared in Example 1b.

Example 3c

PLA4042-Phyllosilicate (Montmorillonite with 5.75 CEC of HDTA and 0.25 CEC of CO)

The same process of Example 3a was carried out but with the modified phyllosilicate prepared in Example 1c.

Example 3d

PLA4042-Phyllosilicate (Montmorillonite with HDTA)

The same process of Example 3a was carried out but with the modified phyllosilicate prepared in Example 2.

Example 3e

PLA2002-Phyllosilicate (Montmorillonite with 5.75 CEC of HDTA and 0.25 CEC of ACO)

The same process of Example 3a was carried out but with PLA2002 and the modified phyllosilicate prepared in Example 1b.

Example 3f

PLA2002-Phyllosilicate (Montmorillonite with HDTA)

The same process of Example 3a was carried out but with PLA2002 and the modified phyllosilicate prepared in Example 2.

Comparative Example 2

Preparation of PLA4042-Phyllosilicate (Montmorillonite with ODTA)

The same process of Example 3a was carried out but with the modified phyllosilicates prepared in Comparative example 1.

Comparative Example 3

Preparation of PLA2002-Phyllosilicate (Montmorillonite with ODTA)

The same process of Example 3a was carried out but with PLA2002 and with the modified phyllosilicates prepared in Comparative example 1.

Example 4

Characterization of the PLA-Phyllosilicate Nanocomposites of Example 3

Mechanical Properties

Mechanical properties were evaluated using a universal testing machine (model M350-20CT), following standard ISO-527.

Results are presented in FIG. 1 showing the Young Modulus and the elongation at break of PLA, (nanocomposites obtained in Example 3a, 3b, and 3c).

As can be observed in FIG. 1, the Young Modulus was increased in the case of PLA nanocomposite versus PLA pure, and also an increase in the elongation at break was observed (best result obtained with nanocomposites prepared in Example 3b) with respect to PLA pure. This was an unexpected result since an increase in Young Modulus generally implies a decrease in the elongation at break.

Figure 2:
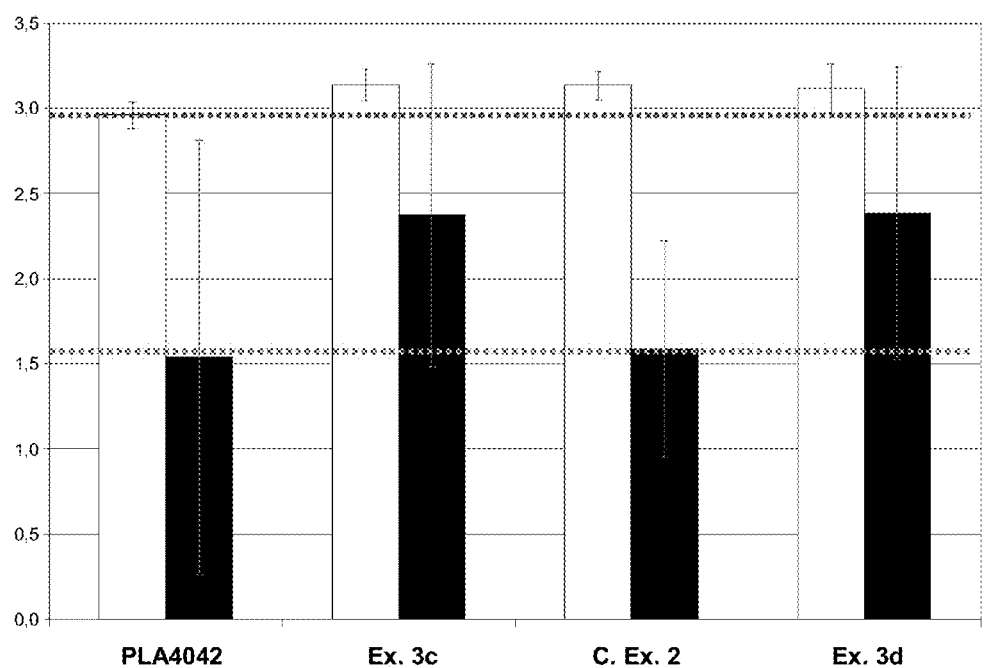
FIG. 2 shows the young Modulus (GPa), (white column) and the elongation at break (mm), (black column) of different samples.

Comparative results of nanocomposites based on PLA 4042 are shown in FIG. 2. It can be seen that the use of modified phyllosilicate of the present disclosure produces an increase in Young Modulus, and also an increase in the elongation at break, as occurred previously in respect of the nanocomposite of comparative example 2. Elongation at break reaches higher values when nanocomposites prepared in Example 3f and 3b were used.

Water Vapour Transmission Rate (WVTR)

Samples were evaluated following the standard ASTM E96 at 23° C. and 50% RH (Relative Humidity) (desiccant method).

Results are shown in Table 1. The smaller the value of the water vapour permeability, the more excellent is the barrier property.

The maximum reduction in WVTR at these conditions was reached with samples wherein the modifying agent is HDTA.

TABLE 1

| Water Vapour permeability of injected samples based on PLA 4042. | |
|---|---|
| Sample | WVTR (g · mm/m$^2$ · day) |
| PLA4042 | 5.08 |
| Nanocomposite prepared in Example 3d | 1.33 |
| Nanocomposite prepared in Example 3b | 2.31 |
| Nanocomposite prepared in Comparative Example 2 | 3.17 |

It was observed that WVTR was reduced when the phyllosilicates are added.

The nanocomposites hereof show a higher reduction of WVTR than the closest prior phyllosilicates. Best results were reached with the nanocomposite prepared in Example 3d, with an improvement of 74%.

The same samples were prepared with PLA 2002 grade; results were presented in Table 2.

TABLE 2

| WVTR results at 23° C. and 50% RH for the composites prepared with PLA2002. | |
|---|---|
| Sample | WVTR (g · mm/m$^2$ · day) |
| PLA2002 | 5.56 |
| Nanocomposite prepared in Example 3f | 1.85 |
| Nanocomposite prepared in Example 3e | 3.48 |
| Nanocomposite prepared in Comparative Example 3 | 5.24 |

The nanocomposites hereof show a high reduction of WVTR when the phyllosilicates is added. This reduction is higher than pure PLA and the reduction showed by the closest prior phyllosilicate (comparative example 3). Best results were reached with the nanocomposite prepared in Example 3f, with an improvement of 67%.

Oxygen Transmission Rate Evaluation Over Samples Prepared with PLA Thermoforming Grade (PLA2002D).

Oxygen transmission rate was evaluated following standard ASTM D3985: "Standard Test Method for Oxygen Gas Transmission Rate Through Plastic Film and Sheeting Using a Coulometric Sensor". Experimental equipment was an OX- TRAN 2/20 SM. The measurements conditions were 23° C. and 50% relative humidity. The test was performed with oxygen (100%).

Results are presented in Table 3.

The results show the reduction in oxygen permeability of the nanocomposites hereof. The best improvement is observed with the nanocomposite prepared in Example 3b, with a reduction in oxygen permeability of almost 15%.

TABLE 3

Oxygen permeability results at 23° C. and 50% RH over the samples prepared with PLA4042 grade.

| SAMPLE | Transmission rate ml/[m² - day] | Permeability ml*mm/ m²*day*Mpa | Improvement respect to neat PLA % |
|---|---|---|---|
| PLA4042 | 11.6 | 176.8 | — |
| Nanocomposite prepared in Example 3b | 9.7 | 150.4 | 14.9 |
| Nanocomposite prepared in Example 3f | 10.9 | 167.4 | 5.3 |
| Nanocomposite prepared in Comparative Example 2 | 11.36 | 176.9 | −0.1 |

Thermal Properties

A differential scanning calorimetric technique was used to show what happens to the different nanocomposites (Ex. 3a, 3b, 3d and Comparative Ex. 2) and PLA 4042 when the nanocomposites and polymer reach melting temperature.

Figure 3:
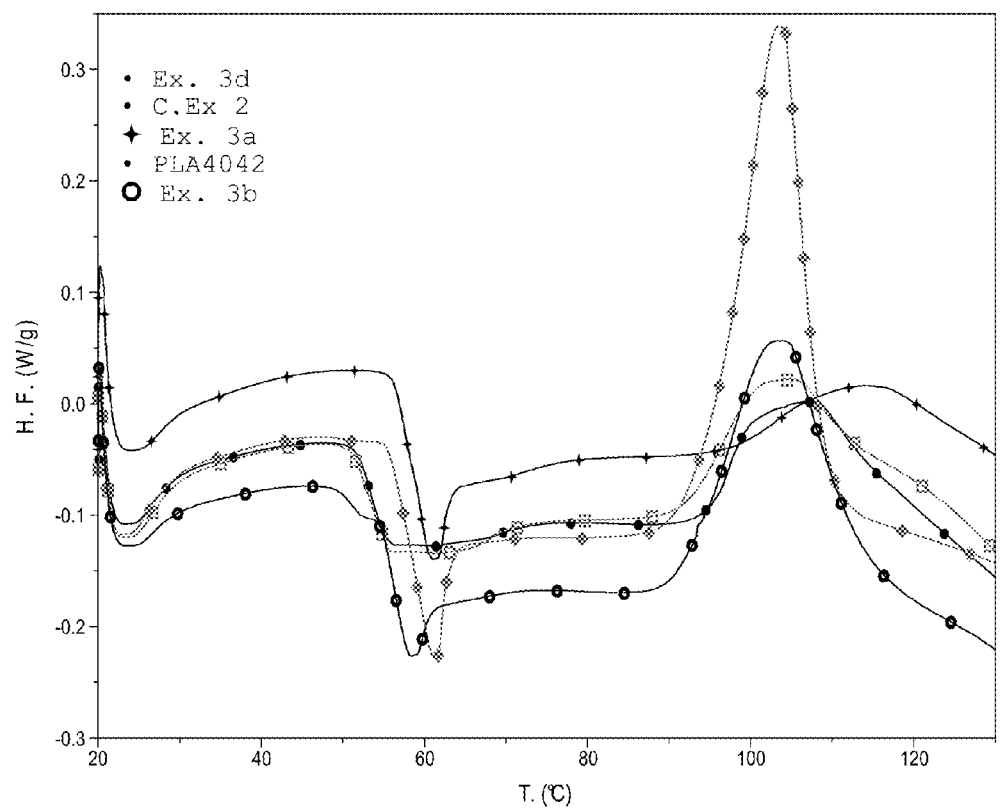
FIG. 3 shows a plot of the heat flow versus temperature of different samples.

The different samples were heated at a controlled rate and a plot of heat flow versus temperature was produced (FIG. 3).

For comparison purposes, included in this Figure is neat PLA 4042. It was observed that the nanocomposites of the present disclosure had a melting point higher than PLA. The nanocomposites of the present disclosure have similar to (Ex. 3d) or better than (Ex. 3a) the thermal properties of the nanocomposite with octadecyltrimethylammonium.

The invention claimed is:

1. A polymer nanocomposite comprising:
   a) a polylactic polymer; and
   b) a modified phyllosilicate composition comprising a montmorillonite and a modifying agent including hexadecyl trimethyl ammonium cations which are intercalated between the layers of the phyllosilicate, and further comprising acetylcholine or choline cations as a modifying agent;
   wherein the acetylcholine or choline is present at a concentration comprised from 0.2-0.75 meq/100 g the value of the phyllosilicate cation exchange capacity and the hexadecyl trimethyl ammonium ions are present at a concentration comprised from 5.25-5.80 meq/100 g the value of the phyllosilicate cation exchange capacity; and,
   wherein the ratio phyllosilicate composition/polylactic polymer is comprised between 0.5:99.5 and 20:80 weight/weight ratio.

2. The nanocomposite according to claim 1 wherein the phyllosilicate is selected from the group consisting of sodium montmorillonite, magnesium montmorillonite, and calcium montmorillonite.

3. The nanocomposite according to claim 2 wherein the phyllosilicate is sodium montmorillonite.

4. A process for the preparation of the nanocomposite according to claim 1, which comprises:
   a) drying the modified phyllosilicate and the polylactic polymer; and
   b) melt-blending the polymer and the modified phyllosilicate by an extruder.

5. The process according to claim 4, wherein the melt-blending operation is carried out at a temperature between 190° C.-210° C.

6. The process according to claim 5, wherein the process further comprises a previous operation of preparing the modified phyllosilicate which comprises:
   (a) dispersing the phyllosilicate in water and an $C_1$-$C_{10}$ alcohol;
   (b) applying an ultrasonic wave;
   (c) performing a cation exchange with choline salt or acetylcholine salt at a concentration comprised from 0.2-0.75 meq/100 g the value of the phyllosilicate cation exchange capacity;
   (d) performing a cation exchange with hexadecyl trimethyl ammonium salt at a concentration comprised from 5.25-5.80 meq/100 g the value of the phyllosilicate cation exchange capacity;
   (e) maintaining the mixture of operation (d) at a temperature comprised between 20° C. and 120° C.;
   (f) isolating the compound obtained in operation (d);
   wherein the operations a), b), c), and d) can be carried out in any order.

7. The process according to claim 6, wherein the phyllosilicate is dispersed in water and ethanol.

8. The process according to claim 6, wherein the mixture of operation (d) is maintained at a temperature comprised between 65° C. and 75° C.

9. The process according to claim 6, wherein the cation exchange operation first is performed with the choline salt or the acetylcholine salt and afterwards is performed with the hexadecyl trimethyl ammonium salt.

10. A container, bag or film made of the nanocomposite according to claim 1.

11. The process according to claim 6, wherein the phyllosilicate is dispersed in water and ethanol; the mixture of operation (d) is maintained at a temperature comprised between 65° C. and 75° C.; and the cation exchange operation first is performed with the choline salt or the acetylcholine salt and afterwards is performed with the hexadecyl trimethyl ammonium salt.

12. The process according to claim 5, wherein the acetylcholine salt or choline salt is a acetylcholine halide or choline halide; and the hexadecyl trimethyl ammonium salt is a hexadecyl trimethyl ammonium halide.

13. The nanocomposite according to claim 1, wherein the acetylcholine or choline is present at a concentration comprised from 0.25-0.50 meq/100 g the value of the phyllosilicate cation exchange capacity, and the hexadecyl trimethyl ammonium ions are present at a concentration comprised from 5.55-5.75 meq/100 g the value of the phyllosilicate cation exchange capacity.

* * * * *